(12) United States Patent
Wu et al.

(10) Patent No.: US 10,684,447 B2
(45) Date of Patent: Jun. 16, 2020

(54) OPTICAL DRIVING MECHANISM

(71) Applicant: TDK TAIWAN CORP., Yangmei Taoyuan (TW)

(72) Inventors: Fu-Yuan Wu, Yangmei Taoyuan (TW); Kuo-Chun Kao, Yangmei Taoyuan (TW); Nai-Wen Hsu, Yangmei Taoyuan (TW); Shih-Ting Huang, Yangmei Taoyuan (TW); Shao-Chung Chang, Yangmei Taoyuan (TW); Sin-Jhong Song, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 346 days.

(21) Appl. No.: 15/723,878

(22) Filed: Oct. 3, 2017

(65) Prior Publication Data

US 2018/0100987 A1   Apr. 12, 2018

Related U.S. Application Data

(60) Provisional application No. 62/405,450, filed on Oct. 7, 2016.

(30) Foreign Application Priority Data

Sep. 29, 2017   (CN) .......................... 2017 1 0904067

(51) Int. Cl.
   *G02B 7/10*   (2006.01)
   *G03B 3/10*   (2006.01)
   *G02B 7/08*   (2006.01)

(52) U.S. Cl.
   CPC ................. *G02B 7/10* (2013.01); *G03B 3/10* (2013.01); *G02B 7/08* (2013.01); *G03B 2205/0007* (2013.01); *G03B 2205/0069* (2013.01)

(58) Field of Classification Search
   CPC ... G02B 7/08; G02B 7/09; G02B 7/04; G02B 7/102; G03B 3/10; H04N 5/2254
   USPC .......................................................... 359/824
   See application file for complete search history.

(56) References Cited

U.S. PATENT DOCUMENTS

| 6,351,436 B1* | 2/2002 | Mallary ............. G11B 11/10534 |
| | | 361/114 |
| 2016/0025995 A1* | 1/2016 | Ariji ......................... G02B 7/08 |
| | | 359/557 |
| 2019/0227199 A1* | 7/2019 | Kao ........................... G03B 9/14 |

* cited by examiner

*Primary Examiner* — Mohammed A Hasan
(74) *Attorney, Agent, or Firm* — Muncy, Geissler, Olds & Lowe, P.C.

(57) ABSTRACT

The disclosure provides an optical driving mechanism, including a frame body, a holding member, a plate coil and a magnet. The holding member is movably disposed in the frame body and configured to hold an optical element. The plate coil is disposed on the holding member. The magnet is disposed on the frame body and corresponds to the plate coil. The plate coil acts with the magnet to generate an electromagnetic force to drive the holding member and the optical element to move along an optical axis of the optical element relative to the frame body.

18 Claims, 9 Drawing Sheets

OPTICAL DRIVING MECHANISM

CROSS REFERENCE TO RELATED APPLICATIONS

This application claims the benefit of US provision Application No. 62/405,450 filed on Oct. 7, 2016, and China Patent Application No. 201710904067.1, filed Sep. 29, 2017, the entirety of which are incorporated by reference herein

BACKGROUND OF THE DISCLOSURE

Field of the Disclosure

The present disclosure relates to an optical driving mechanism, and more particularly to an optical driving mechanism utilizing a plate coil and a magnet to generate an electromagnetic force to drive an optical element to move.

Description of the Related Art

As technology has progressed, many kinds of electronic devices, such as tablet computers and smart phones, have included the functionality of digital photography or video recording. A user can operate the electronic device to capture various images using the camera module of the electronic device. Therefore, electronic devices having a camera module have gradually become popular.

In current camera modules, a winding coil and a magnet are used to generate an electromagnetic force to drive a lens to move, so as to implement the function of auto-focusing. However, the winding coil may not be wound uniformly following a winding procedure, and this can affect the magnetic force. In addition, the winding coil needs a sufficient thickness to provide an electromagnetic force of the required intensity, so that the size of the camera module cannot be reduced any further. Moreover, because the width of the winding coil is less than the width of the magnet, the intensity of the electromagnetic force is affected.

Therefore, how to design an optical driving mechanism which can provide an electromagnetic force of sufficient intensity and can achieve the purpose of miniaturization at the same time is an important subject for further research and development.

BRIEF SUMMARY OF THE DISCLOSURE

Accordingly, one objective of the present disclosure is to provide an optical driving mechanism adopting a plate coil, that can enhance the electromagnetic force generated by magnetics and the plate coil, so as to increase the driving ability of the optical driving mechanism.

According to some embodiments of the disclosure, an optical driving mechanism includes a frame body, a holding member, a plate coil and a magnet. The holding member is movably disposed in the frame body and configured to hold an optical element. The plate coil is disposed on the holding member. The magnet is disposed on the frame body and corresponds to the plate coil. The plate coil acts with the magnet to generate an electromagnetic force to drive the holding member and the optical element to move along an optical axis of the optical element relative to the frame body.

In some embodiments, the plate coil is parallel to the optical axis.

In some embodiments, the optical driving mechanism further includes a conductive element, disposed on the holding member, and the conductive element includes two electrical connecting portions, wherein the electrical connecting portions are connected to the plate coil and are disposed on the same side of the holding member.

In some embodiments, the holding member further includes a stop portion which is in contact with the plate coil and which constrains the plate coil in a preset position of the holding member.

In some embodiments, the plate coil includes two protruding portions, and the stop portion is located between the protruding portions.

In some embodiments, the optical driving mechanism further includes a conductive element, disposed on the holding member and electrically connected to the protruding portions.

In some embodiments, the conductive element is a resilient element for connecting the frame body and the holding member.

In some embodiments, the conductive element includes a first welding surface, the plate coil includes a second welding surface, the second welding surface is perpendicular to the first welding surface, and the conductive element and the plate coil are welded to each other via the first welding surface and the second welding surface.

In some embodiments, the optical driving mechanism further includes a casing and a plurality of a damping elements, and the holding member includes at least one constraining portion, wherein the damping elements are configured to connect the constraining portion to the casing or connect the constraining portion to the frame body.

In some embodiments, the holding member includes a groove, configured to accommodate the plate coil.

In some embodiments, the holding member further includes two constraining portions which protrude on one side of the holding member, and the groove is formed between the constraining portions.

In some embodiments, the optical driving mechanism further includes a casing, and the constraining portions are in contact with the casing, so as to constrain the holding member in a first-limit position.

In some embodiments, the constraining portions are in contact with the frame body, so as to constrain the holding member in a second-limit position.

In some embodiments, the width of the plate coil along a horizontal direction is greater than the width of the magnet along the horizontal direction, wherein the horizontal direction is perpendicular to the optical axis.

In some embodiments, the holding member has a minimum thickness along a side direction, the plate coil has a thickness along the side direction, and the thickness of the plate coil is greater than the minimum thickness, wherein the side direction is perpendicular to the optical axis.

In some embodiments, the plate coil is an H-coil.

In some embodiments, there is a plurality of layers in the plate coil, each layer has a height and a width, and the ratio of height to width is greater than 1.5.

In some embodiments, the holding member includes two stop portions, disposed on the corners of two opposite sides of the holding member.

In some embodiments, the optical driving mechanism further includes a circuit element which is formed on the holding member using molded interconnect device (MID) technology.

In some embodiments, a separating distance along a side direction is formed between the circuit element and the plate coil, and the side direction is perpendicular to the optical axis.

In conclusion, the present disclosure provides the optical driving mechanism which includes the frame body, the holding member, at least one plate coil and at least one magnet. In some embodiments, the holding member can have a groove and a stop portion, and the plate coil can be installed inside the groove and make contact with the stop portion in a preset position. Due to the design of the groove and the stop portion, the convenience of assembling the plate coil can be improved, and the accuracy of positioning the plate coil on the holding member can also be improved.

In some embodiments, when the plate coil is adopted, the width of the optical driving mechanism along the X-axis can be reduced, so as to achieve the purpose of miniaturization. In addition, because the electrical connecting portions of the second resilient element and the corresponding plate coil are disposed on the same side of the holding member, the electrical connecting portions can be directly electrically connected to the corresponding plate coil through the solder without any additional leading wire to implement the electrical connection of the plate coil and the electrical connecting portions. Therefore, the problem of the leading wire being easily broken when the optical driving mechanism is shocked can be solved. Furthermore, the solder is disposed on the inner side of the first coil and faces the holding member, so that the solder can be prevented from colliding with other elements in the optical driving mechanism, causing damage to the solder. Moreover, the electrical connecting portion and the corresponding plate coil are welded to each other via the first welding surface and the second welding surface, so that the contact areas between the solder and the first welding surface and between the solder and the second welding surface can be increased, so as to increase the strength of the weld.

In some embodiments, there can be damping elements disposed between the constraining portions and the columns and between the constraining portions and the casing. Therefore, the damping element can prevent the constraining portion to collide with the column or the casing when the optical driving mechanism is shocked. In addition, the damping element can help the holding member quickly return to the original position when the holding member is shocked, so that the response time and accuracy can be improved when the optical driving mechanism performs the image focusing function.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION OF THE ILLUSTRATIVE EMBODIMENTS

Figure 1:
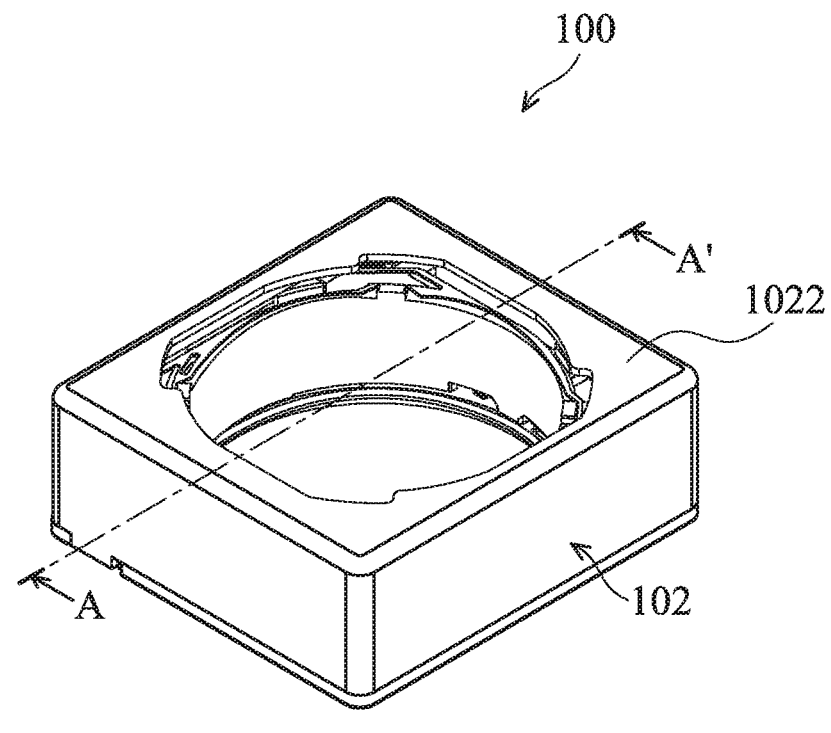
FIG. 1 is a diagram of an optical driving mechanism according to an embodiment of the disclosure.
Figure 1:
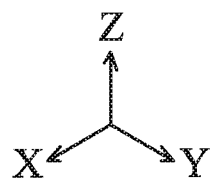

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
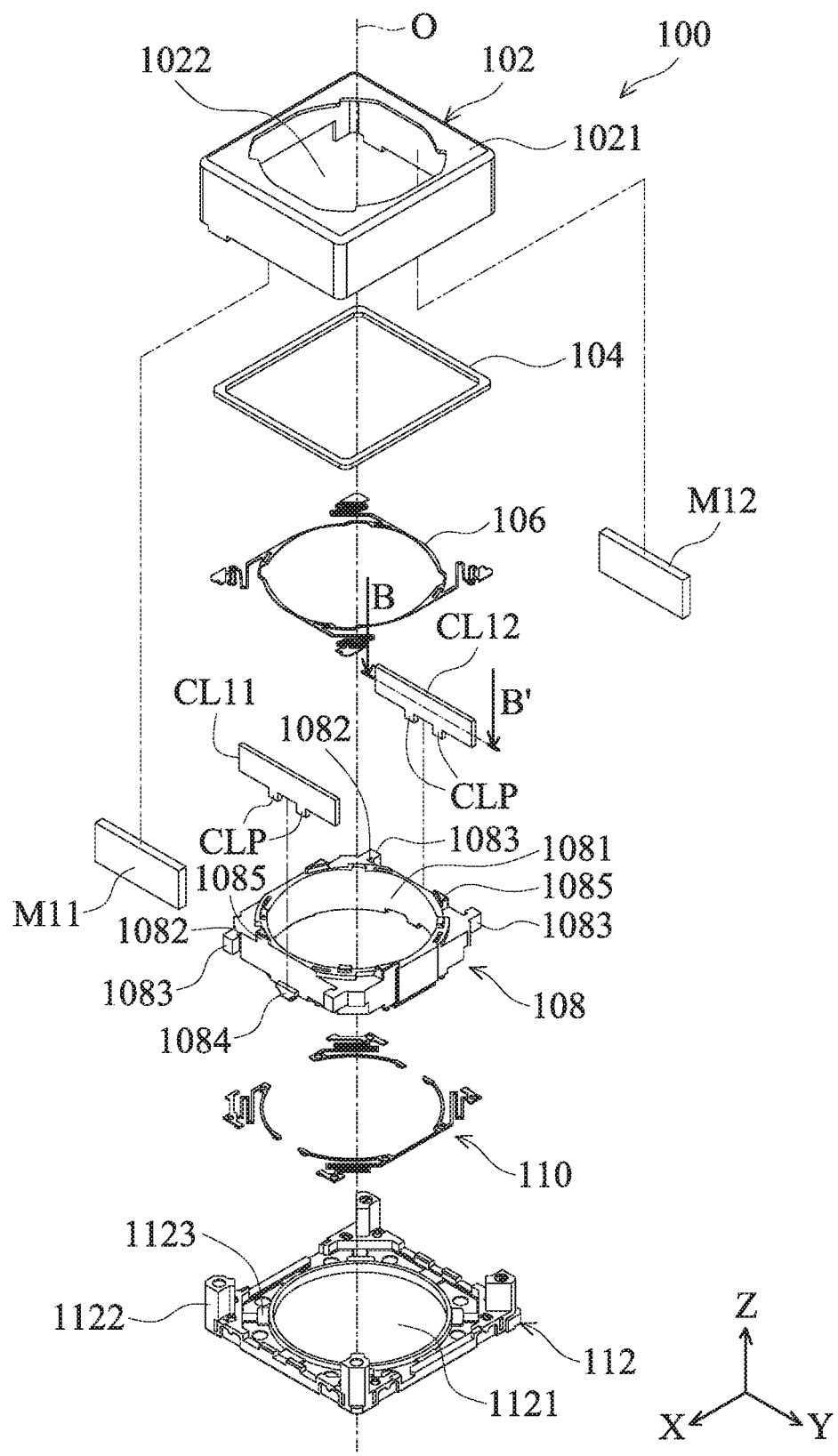
FIG. 2 shows an exploded diagram of the optical driving mechanism in FIG. 1 according to the embodiment of the disclosure.
Figure 3:
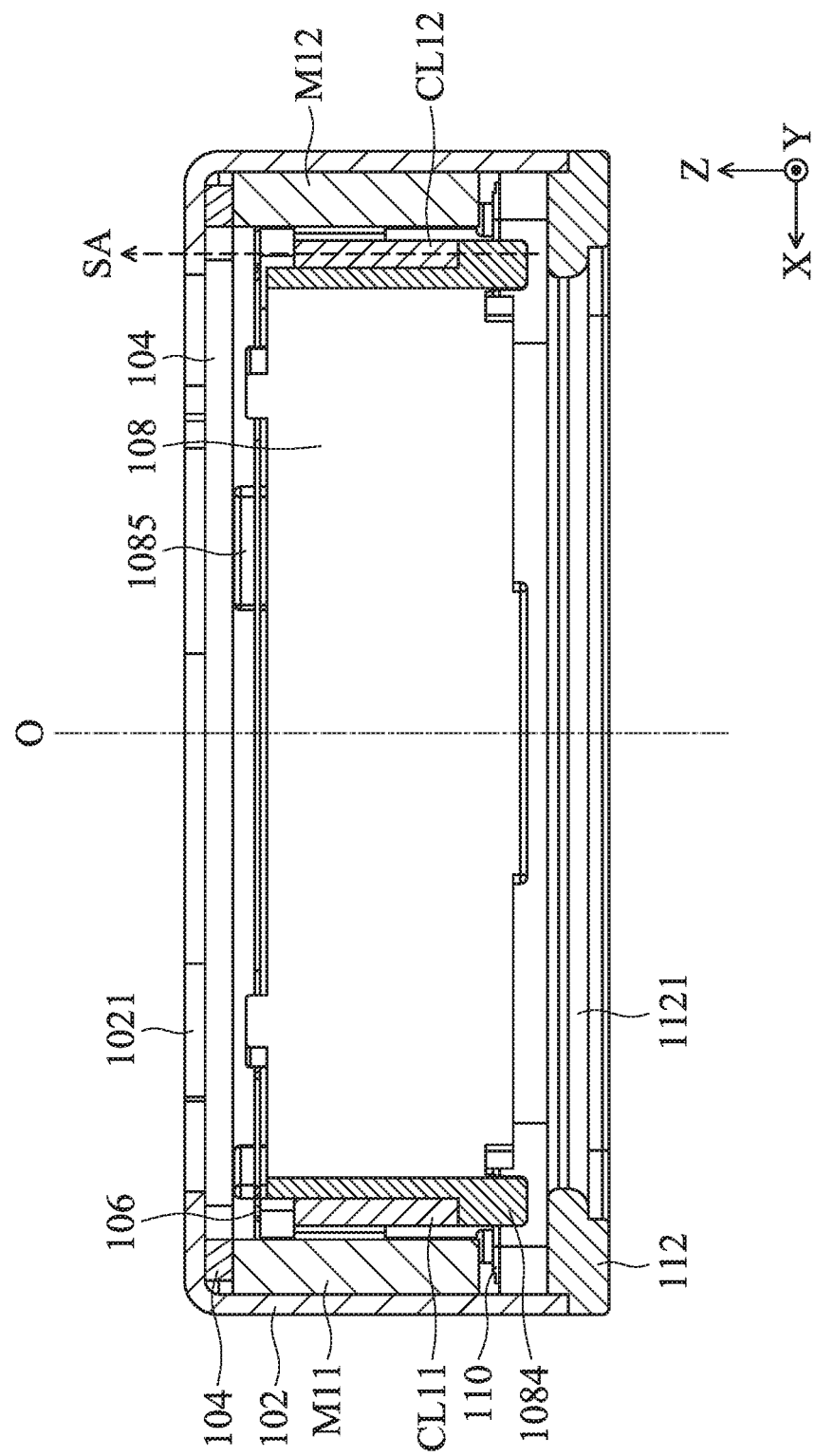
FIG. 3 shows a cross-sectional view along line A-A' in FIG. 1 according to the embodiment of the disclosure.

Please refer to FIG. 1 to FIG. 3. FIG. 1 is a schematic diagram of an optical driving mechanism 100 according to an embodiment of the disclosure. FIG. 2 shows an exploded diagram of the optical driving mechanism 100 in FIG. 1 according to the embodiment of the disclosure. FIG. 3 shows a cross-sectional view along line A-A' in FIG. 1 according to the embodiment of the disclosure. The optical system 100 can be an optical element driving module, included in an image capturing system for holding and driving an optical element (not shown in the figures). The optical driving mechanism 100 may be provided in several electronic devices or portable electronic devices, such as a smartphone or a tablet, for allowing the user to perform the image capturing function. In this embodiment, the optical driving mechanism 100 can be a voice coil motor (VCM) equipped with an auto-focus (AF) function, but it is not limited thereto. In some embodiments, the optical driving mechanism 100 may also be equipped with auto-focus (AF) and OIS functions.

As shown in FIG. 1 to FIG. 3, in this embodiment, the optical driving mechanism 100 main includes a casing 102, a top frame 104, a first resilient element 106, a holding member 108, a first magnet M11, a second magnet M12, a first coil CL11, a second coil CL12, a second resilient element 110 and a frame body 112. The holding member 108 is configured to hold an optical element (not shown in figures). The optical element can be an optical lens, but it is not limited thereto. In this embodiment, the first coil CL11 and the second coil CL12 can be plate coils which are respectively disposed on two opposite sides of the holding member 108. The first coil CL11 corresponds to the first magnet M11, and the second coil CL12 corresponds to the second magnet M12. When a current is applied to the first coil CL11 and the second coil CL12, the first coil CL11 and the second coil CL12 can respectively act with the first magnet M11 and the second magnet M12 to generate an electromagnetic force, so as to drive the holding member 108 and the optical element to move relative to the frame body 112 along the Z-axis. Furthermore, it should be noted that the first coil CL11 and the second coil CL12 provided in this disclosure are respectively disposed on the two opposite sides of the holding member 108, so that this configuration can reduce the magnetic interference between the coils (the first coil CL11 and the second coil CL12) and other elements inside the optical driving mechanism 100.

The casing 102 has a hollow structure, and can be combined with the frame body 112. The casing 102 has a top surface 1021, a casing opening 1022 is formed on the top surface 1021, and a frame opening 1121 is formed on the frame body 112. The center of the casing opening 1022 corresponds to an optical axis O of the optical element (not shown in the figures) which is held by the holding member 108. The frame opening 1121 corresponds to an image sensing element (now shown in the figures) below the frame body 112. The external light can travel from the casing opening 1022 into the casing 102, and the external light travels through the optical element and the frame opening 1121 and then is received by the image sensing element (now shown in the figures), so as to generate a digital image signal. Accordingly, the electromagnetic force generated by the magnets and the coils mentioned before can drive the holding member 108 and the optical element to move along the optical axis O (the Z-axis) to perform the image focusing function.

As shown in FIG. 2, the holding member 108 has a hollow ring structure, and the holding member 108 further has a through hole 1081, two grooves 1082, four constraining portions 1083, two stop portions 1084 and two contact portions 1085. The through hole 1081 forms a threaded structure (not shown) corresponding to another threaded structure (not shown) on the optical element, such that the optical element can be locked in the through hole 1081. Two of the constraining portions 1083 protrude from one side of the holding member 108, and the other two of the constraining portions 1083 protrude from the opposite side of the holding member 108. In this embodiment, the groove 1082 can be formed between two corresponding constraining portions 1083 for accommodating the coils mentioned before. In this embodiment, the coil (such as first coil CL11) can be completely accommodated in the groove 1082, but it is not limited thereto. For example, a part of the first coil CL11 is accommodated in the groove 1082.

Figure 5:
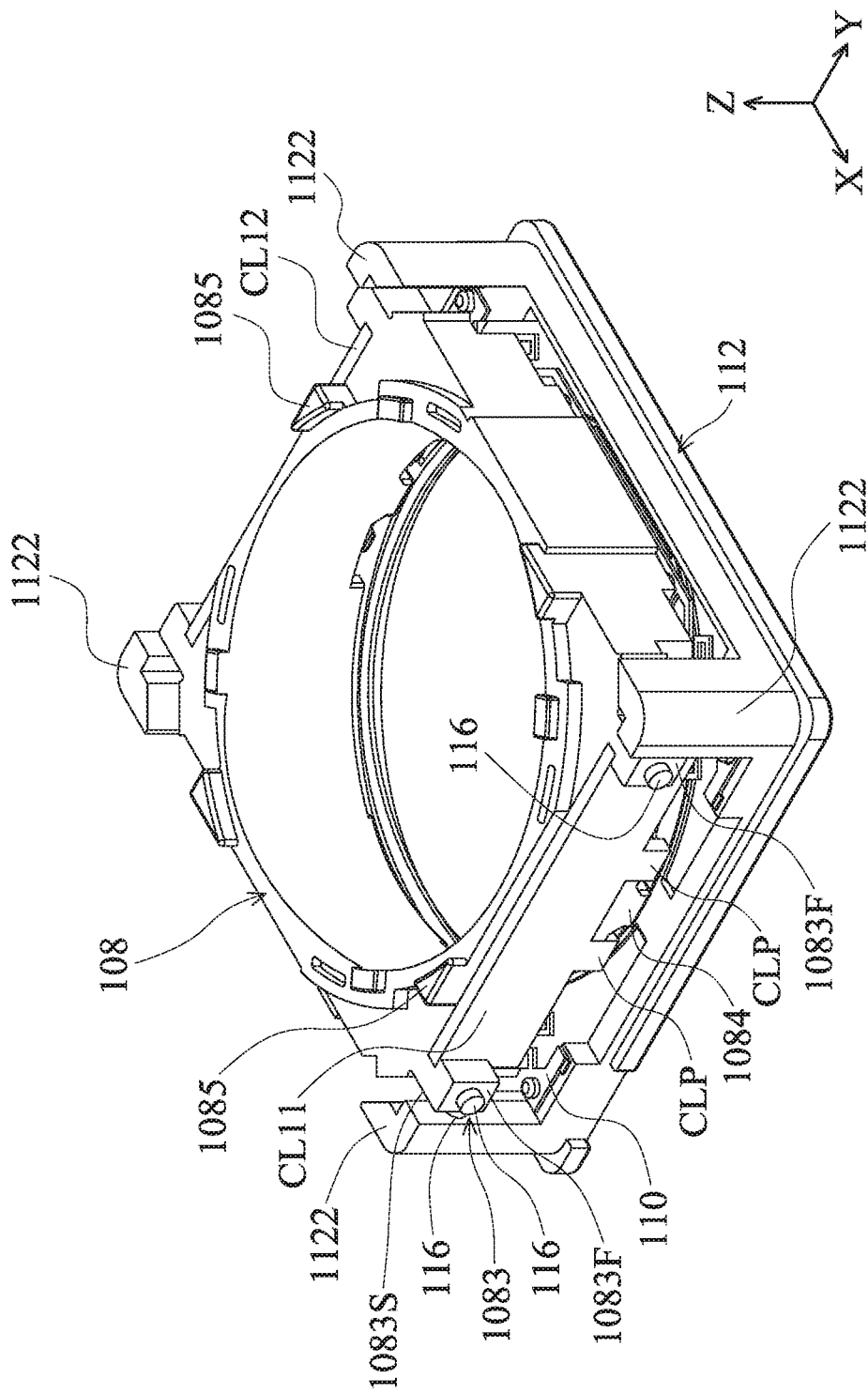
FIG. 5 is a partial diagram of the optical driving mechanism according to one embodiment of the disclosure.

In this embodiment, the first coil CL11 and the second coil CL12 are plate coils and have rectangular structures. A transverse direction SA of the first coil CL11 or the second coil CL12 is parallel to the optical axis O (as shown in FIG. 3). In addition, as shown in FIG. 2, the first coil CL11 and the second coil CL12 respectively have two protruding portions CLP corresponding to the two stop portions 1084. Due to the angle of view, only one stop portion 1084 is shown in FIG. 2. Take the first coil CL11 for example, when the first coil CL11 is inserted into the groove 1082 along the −Z-axis, the stop portion 1084 makes contact with the first coil CL11 (the plate coil) and constrains the first coil CL11 in a preset position of the holding member 108, and the stop portion 1084 is located between the two protruding portions CLP, as shown in FIG. 5.

It should be noted that in some embodiments, the holding member 108 can only include the stop portions 1084, and the first coil CL11 and the second coil CL12 are positioned on the holding member 108 by the corresponding stop portion 1084. In addition, in some embodiments, the holding member 108 can only include the stop portions 1084 and the constraining portions 1083, and the first coil CL11 and the second coil CL12 are positioned on the holding member 108 by the corresponding stop portion 1084 and the constraining portions 1083. The manner of positioning the first coil CL11 and the second coil CL12 on the holding member 108 is not limited these embodiments of the disclosure.

As shown in FIG. 2 and FIG. 3, the top frame 104 is disposed between the holding member 108 and the casing 102, and the top frame 104 is affixed to the inner surface of the casing 102. When the holding member 108 moves along the Z-axis, the top frame 104 makes contact with the contact portions 1085, so as to constrain the movement of the holding member 108 along the Z-axis. In some embodiments, the top frame 104 and the casing 102 can be integrally formed in one piece. Furthermore, the first magnet M11 and the second magnet M12 are securely disposed on the inner surface of the casing 102, and the first magnet M11 and the second magnet M12 can include at least one multipole magnet for acting with the corresponding coil to drive the holding member 108 to move along the optical axis O, so as to perform the image focusing function.

Please refer to FIG. 2 and FIG. 3 together. Four columns 1122 and an accommodating slot 1123 are formed on the frame body 112. The outer peripheral portion of the first resilient element 106 is fixed to the four columns 1122, and the outer peripheral portion of the second resilient element 110 is fixed to the accommodating slot 1123. Moreover, the inner peripheral portions of the first resilient element 106 and the second resilient element 110 are respectively connected to the upper and lower sides of the holding member 108, so that the holding member 108 can be suspended in the frame body 112 (as shown in FIG. 3). In this embodiment, the first resilient element 106 or the second resilient element 110 can be integrally formed in one piece, but they are not limited thereto. For example, in this embodiment, the second resilient element 110 consists of three separating spring sheet. It should be noted that the first resilient element 106 and the second resilient element 110 can be conductive elements.

Figure 4:
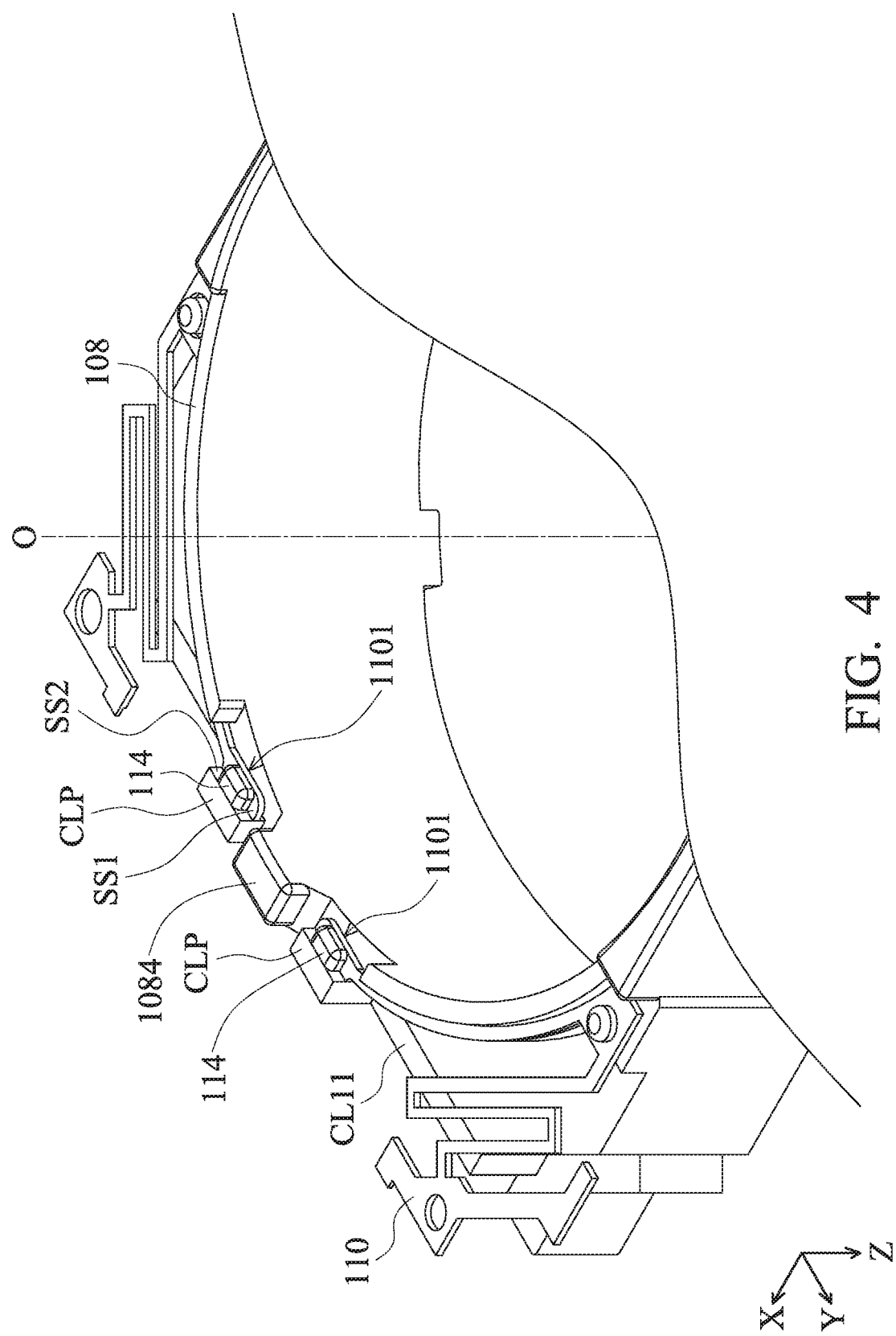
FIG. 4 is a partial structural diagram of the holding member, the first coil and the second resilient element according to an embodiment of the disclosure.

Please refer to FIG. 4, which is a partial structural diagram of the holding member 108, the first coil CL11 and the second resilient element 110 according to an embodiment of the disclosure. In this embodiment, the second resilient element 110 is disposed on the holding member 108 and includes two electrical connecting portions 1101, and the electrical connecting portions 1101 are electrically connected to the first coil CL11 through solders 114. The first coil CL11 and the electrical connecting portions 1101 are located on the same side of the holding member 108. Specifically, each electrical connecting portion 1101 has a first welding surface SS1, and each protruding portion CLP of the first coil CL11 has a second welding surface SS2. The solder 114 is configured to contact the first welding surface SS1 and the second welding surface SS2, and then the solder 114 is heated, so that the electrical connecting portion 1101 and the first coil CL11 are welded to each other via the first welding surface SS1 and the second welding surface SS2. It should be noted that the first welding surface SS1 is perpendicular to the second welding surface SS2, but it is not limited thereto.

The electrical connecting portions 1101, the second welding surface SS2 of the protruding portion CLP and the solder 114 are disposed toward the optical axis O of the optical element held by the holding member 108. That is, the solder 114 is disposed on the inner side of the first coil CL11, so that it can prevent the solder 114 from colliding with other elements (such as the first magnet M11) in the optical driving mechanism 100, causing damage to the solder 114 and a short-circuit problem. In addition, the electrical connecting portion 1101 and the first coil CL11 are welded to each other via the first welding surface SS1 and the second welding surface SS2, so that the contact areas between the solder 114 and the first welding surface SS1 and between the solder 114 and the second welding surface SS2 can be increased, so as to increase the strength of the weld. It should be noted that the first coil CL11 and the second coil CL12 are plate coils, and the layers of the coil of the plate coil are disposed inside the plate coil and are directly electrically connected to the electrical connecting portions 1101 through the solder 114 without any additional leading wire to implement the electrical connection of the plate coil and the electrical connecting portions 1101. Therefore, there is no worry about the leading wire being broken easily in this disclosure.

Figure 6:
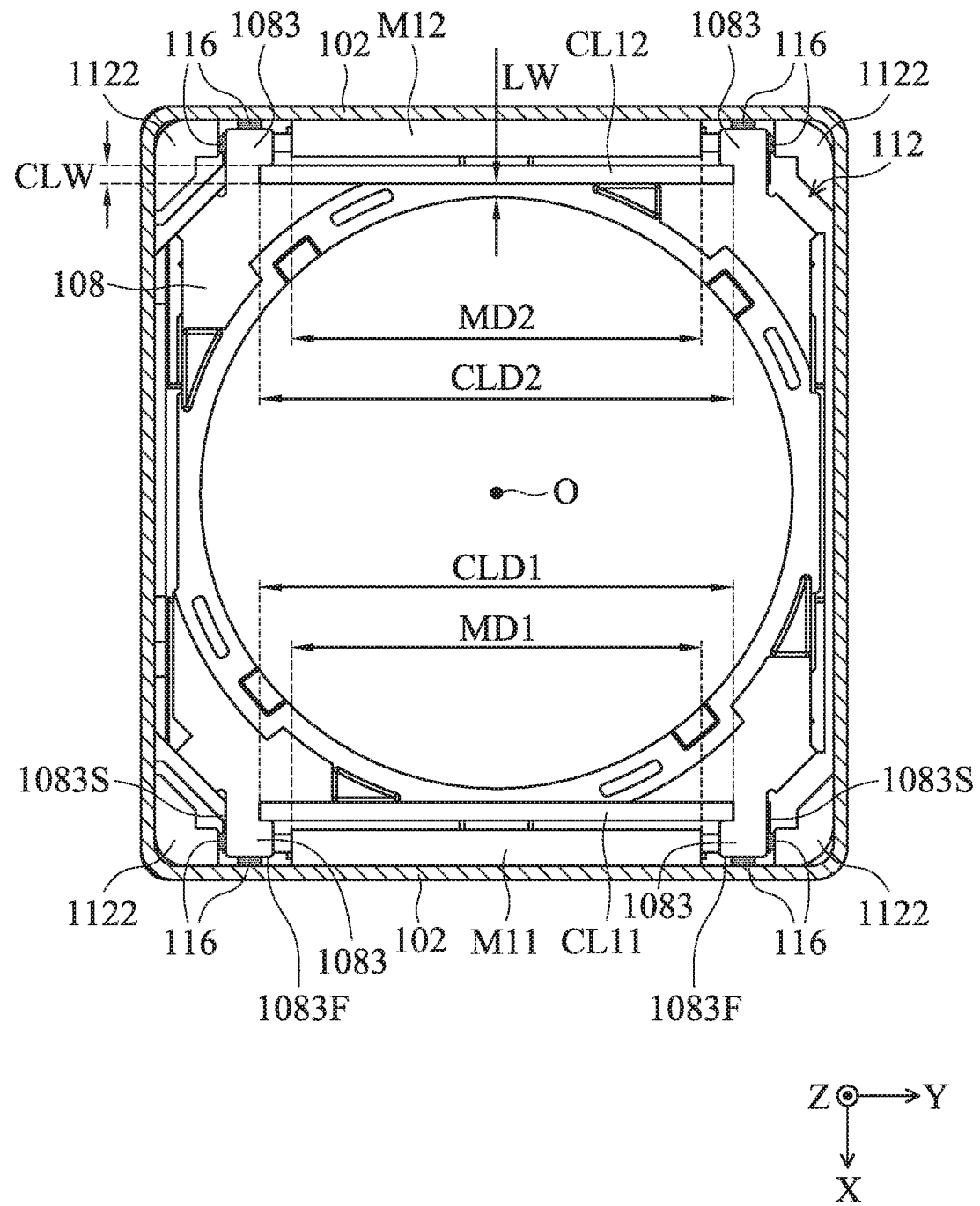
FIG. 6 is a top view of the optical driving mechanism removing the top surface of the casing, the top frame and the first resilient element according to one embodiment of the disclosure.

Please refer to FIG. 5 and FIG. 6. FIG. 5 is a partial diagram of the optical driving mechanism 100 according to one embodiment of the disclosure. FIG. 6 is a top view of the optical driving mechanism 100 removing the top surface 1021 of the casing 102, the top frame 104 and the first resilient element 106 according to one embodiment of the disclosure. For clearly representing the relations between each element, only some elements of the optical driving mechanism 100 are disclosed in FIG. 5 and FIG. 6. In this embodiment, each constraining portion 1083 includes a front surface 1083F and a side surface 1083S. The front surface 1083F faces the casing 102, and the side surface 1083S faces the columns 1122. In addition, the optical driving mechanism 100 can further include a plurality of damping elements 116 which are disposed on the front surface 1083F and the side surface 1083S. More specifically, the damping element 116 can be disposed between the front surface 1083F and the casing 102, so as to connect the constraining portion 1083 with the casing 102. The damping element 116 can also be disposed between the side surface 1083S and the column 1122, so as to connect the constraining portion 1083 with the column 1122 (as shown in FIG. 6). In this embodiment, the damping element 116 can be a gel, but it is not limited to this embodiment.

When the optical driving mechanism 100 is shocked by an external force, the holding member 108 may shake along the XY plane due to the shock. At this time, because there are damping elements 116 disposed between the constraining portions 1083 and the columns 1122 and disposed between the constraining portions 1083 and the casing 102, the constraining portions 1083 can be prevented from colliding with the columns 1122 or the casing 102. In addition, the damping elements 116 can further help the holding member 108 quickly return to the original position after being shocked. It should be noted that if the holding member 108 is shocked and the constraining portion 1083 comes into contact with the column 1122 of the frame body 112 in FIG. 6, the column 1122 can constrain the holding member 108 in a limit position (i.e. the second-limit position) along the Y-axis. In addition, if the holding member 108 is shocked and the constraining portion 1083 comes into contact with the casing 102, the casing 102 can constrain the holding member 108 in a limit position (i.e. the first-limit position) along the X-axis.

In addition, as shown in FIG. 6, a first width CLD1 of the first coil CL11 along the Y-axis (the horizontal direction) is greater than a second width MD1 of the first magnet M11 along the Y-axis, and a third width CLD2 of the second coil CL12 along the Y-axis is also greater than a fourth width MD2 of the second magnet M12 along the Y-axis. The widths of the coils (the first coil CL11 and the second coil CL12) along the Y-axis are greater than the widths of the magnet (the first magnet M11 and the second magnet M12) along the Y-axis, so that the capability of the electromagnetic induction between the coils and the magnets is increased, so as to provide a sufficient electromagnetic force when the current is applied to the coils. In this embodiment, the horizontal direction is perpendicular to the optical axis O (the Z-axis). Moreover, the holding member 108 has a minimum thickness LW along the X-axis (the side direction), and the second coil CL12 has a thickness CLW along the X-axis. The thickness CLW (such as 0.2 mm) is greater than the minimum thickness LW (such as 0.15 mm), so that when the second coil CL12 is installed on the holding member 108, the structural strength of the holding member 108 can be enhanced, so as to prevent the structure of the holding member 108 corresponding to the minimum thickness LW from being damaged because the minimum thickness LW is too small.

Figure 7:
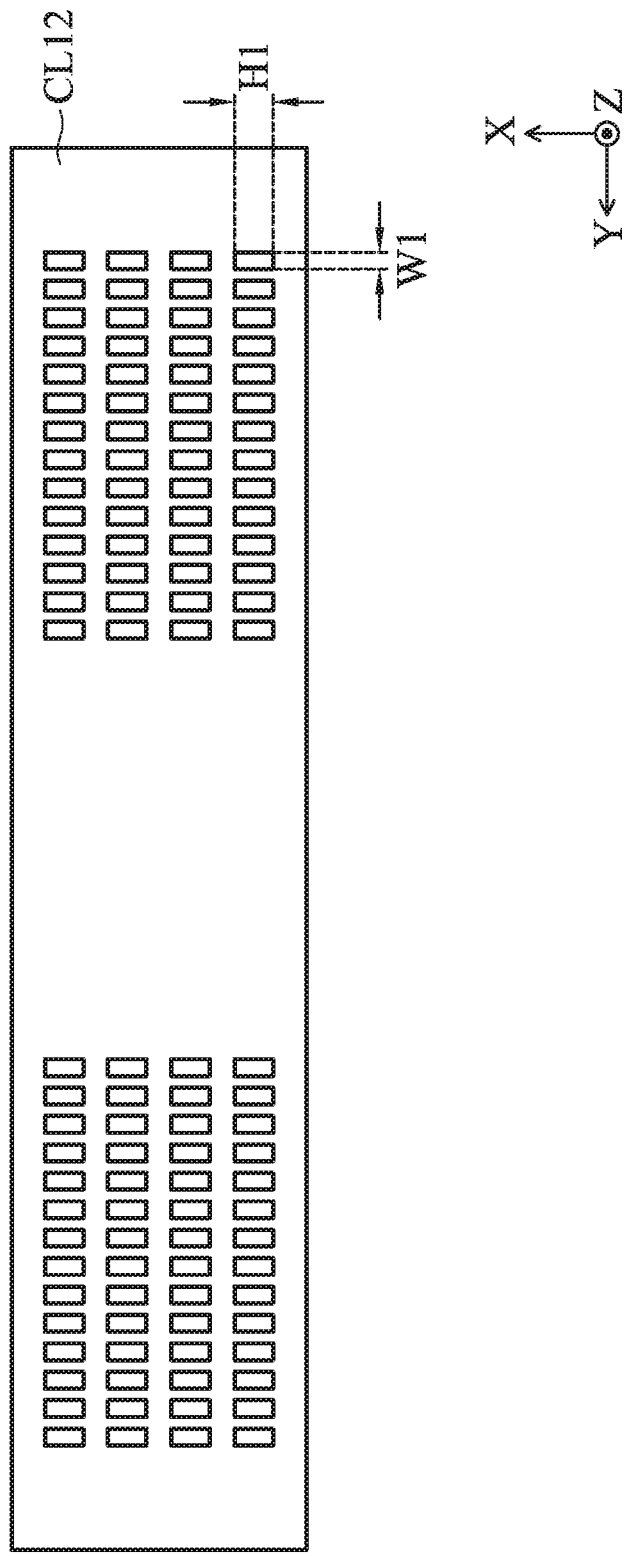
FIG. 7 is a cross-sectional view of the second coil according to the embodiment of the disclosure.

Please refer to FIG. 7, which is a cross-sectional view of the second coil CL12 according to the embodiment of the disclosure. For example, the cross-sectional view of the second coil CL12 can be viewed along line B-B' in FIG. 2. In this embodiment, the first coil CL11 or the second coil CL12 can be an H-coil. As shown in FIG. 7, there are four layers inside the second coil CL12, and the height H1 of each layer is greater than the width W1 of each layer. For example, the ratio H1/W1 of the height H1 and the width W1 is greater than 1.5. Based on this design, the first coil CL11 and the second coil CL12 can be stronger than a conventional plate coil to resist the shear force and cannot be easily broken.

Figure 8:
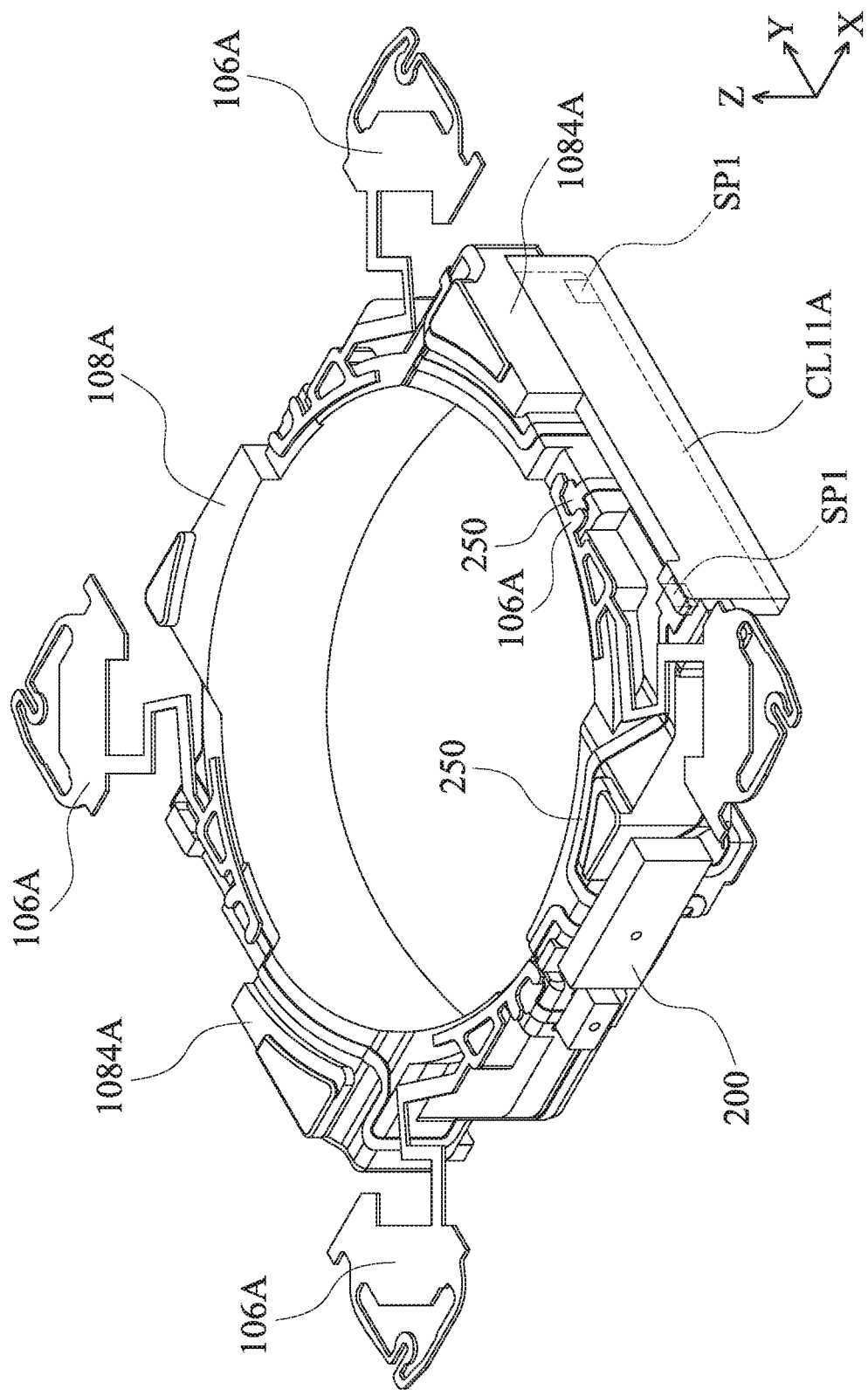
FIG. 8 is a diagram of a holding member, a first coil, a first resilient element and a sensing element according to another embodiment of the disclosure.

Please refer to FIG. 8, which is a diagram of a holding member 108A, a first coil CL11A, a first resilient element 106A and a sensing element 200 according to another embodiment of the disclosure. The holding member 108A includes two stop portions 1084A respectively disposed on two opposite sides of the holding member 108A. Specifically, in this embodiment, the stop portion 1084A is located on a corner of a side of the holding member 108A. For example, as shown in FIG. 8, one of the stop portion 1084A is located on the upper right corner. Therefore, compared to the stop portion 1084 of previous embodiments, the stop portion 1084A of this embodiment can have a larger area and volume to support the first coil CL11A. This design not only enhances the overall structural strength of the holding member 108A, but also achieves the purpose of miniaturization.

In addition, in this embodiment, a plurality of circuit elements 250 (such as wires) can be formed on the holding member 108A using molded interconnect device (MID) technology. Two solder joints SP1 of the first coil CL11A are respectively located on the upper left corner and lower right corner, and the solder joints SP1 face the holding member 108A (the solder joints SP1 are illustrated in dashed lines). Based on the asymmetric structural design of the first coil CL11A and the holding member 108A, a larger space can be formed between the holding member 108A and the first resilient element 106A to serve as a collision buffer area when the first resilient element 106A shakes. Furthermore, it should be noted that the sensing element 200 in this embodiment can be directly electrically connected to the first coil CL11A through the circuit elements 250, so as to drive the first coil CL11A.

Figure 9:
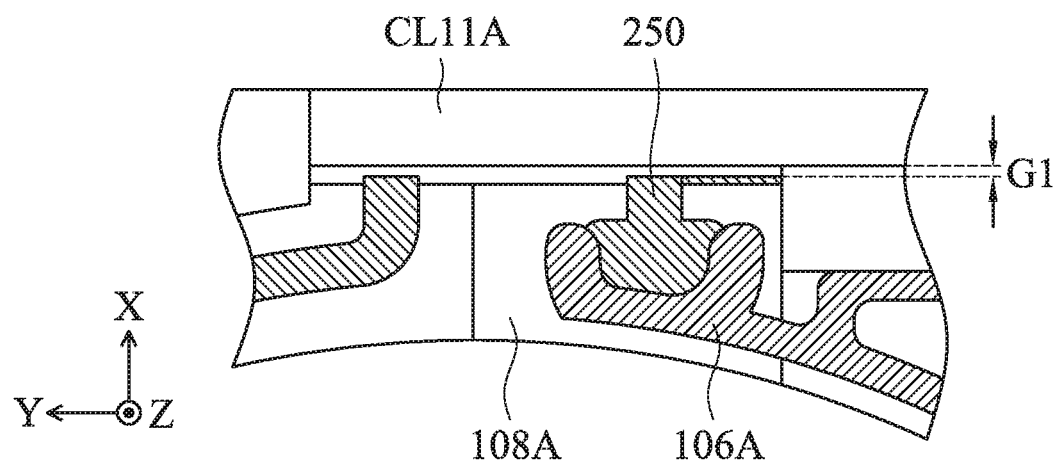
FIG. 9 is a top view of a partial structural diagram viewed along the Z-axis in FIG. 8 according to the embodiment of the disclosure.
Figure 10:
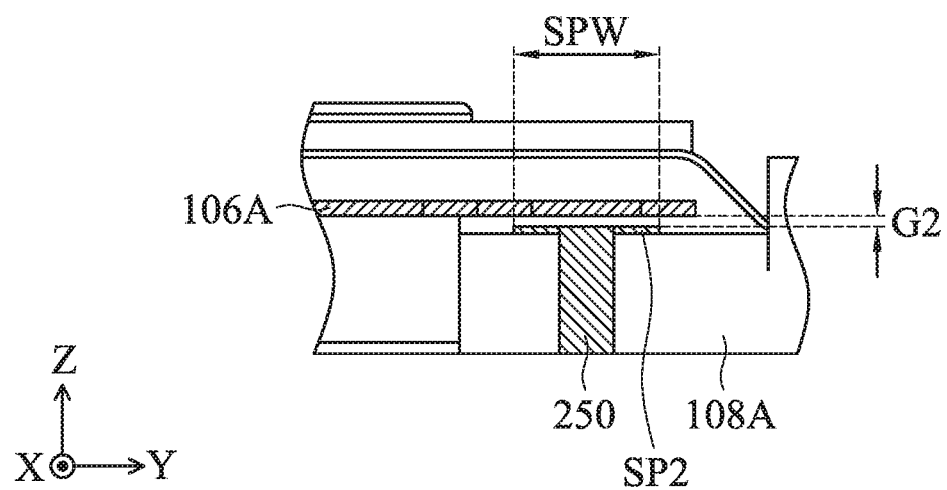
FIG. 10 is a side view of a partial structural diagram along the X-axis in FIG. 8 according to the embodiment of the disclosure.

Please refer to FIG. 9, which is a top view of a partial structural diagram viewed along the Z-axis in FIG. 8 according to the embodiment of the disclosure. As shown in FIG. 9, a separating distance G1 is formed between the circuit element 250 and the first coil CL11A along the X-axis. The collision problem between the circuit element 250 on the holding member 108A and the first coil CL11A can be prevented due to this design. Next, please refer to FIG. 10, which is a side view of a partial structural diagram viewed along the X-axis in FIG. 8 according to the embodiment of the disclosure. As shown in FIG. 10, the circuit element 250 on the holding member 108A has a solder joint SP2. The solder joint SP2 has a width SPW, and a separating distance G2 is formed between the solder joint SP2 and the first resilient element 106A. The welding area can be increased and the convenience of performing welding operation by an operator can be improved due to the design of the width SPW and the separating distance G2.

In conclusion, the present disclosure provides the optical driving mechanism 100 which includes the frame body 112, the holding member 108, at least one plate coil and at least one magnet. In some embodiments, the holding member 108 can have a groove 1082 and a stop portion 1084, and the plate coil can be installed inside the groove 1082 and be in contact with the stop portion 1084 in a preset position. Due to the design of the groove 1082 and the stop portion 1084, the convenience of assembling the plate coil can be improved, and the accuracy of positioning the plate coil on the holding member 108 can also be improved.

In some embodiments, when the plate coil is adopted, the width of the optical driving mechanism 100 along the X-axis can be reduced, so as to achieve the purpose of miniaturization. In addition, because the electrical connecting portions 1101 of the second resilient element 110 and the corresponding plate coil are disposed on the same side of the holding member 108, the electrical connecting portions 1101 can be directly electrically connected to the corresponding plate coil through the solder 114 without any additional leading wire to implement the electrical connection of the plate coil and the electrical connecting portions 1101. Therefore, the problem of the leading wire being easily broken when the optical driving mechanism 100 is shocked can be solved. Furthermore, the solder 114 is disposed on the inner side of the first coil CL11 and faces the holding member 108, so that the solder 114 can be prevented from colliding with other elements in the optical driving mechanism 100, causing damage to the solder 114. Moreover, the electrical connecting portion 1101 and the corresponding plate coil are welded to each other via the first welding surface SS1 and the second welding surface SS2, so that the contact areas between the solder 114 and the first welding surface SS1 and between the solder 114 and the second welding surface SS2 can be increased, so as to increase the strength of the weld.

In some embodiments, there can be damping elements 116 disposed between the constraining portions 1083 and the columns 1122 and between the constraining portions 1083 and the casing 102. Therefore, the damping element 116 can prevent the constraining portion 1083 to collide with the column 1122 or the casing 102 when the optical driving mechanism 100 is shocked. In addition, the damping element 116 can help the holding member 108 quickly return to the original position when the holding member 108 is shocked, so that the response time and accuracy can be improved when the optical driving mechanism 100 performs the image focusing function.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical driving mechanism, comprising:
   a frame body;
   a holding member, movably disposed in the frame body and configured to hold an optical element;
   a plate coil, disposed on the holding member; and
   a magnet, disposed on the frame body, wherein the magnet corresponds to the plate coil;
   wherein the plate coil acts with the magnet to generate an electromagnetic force to drive the holding member and the optical element to move along an optical axis of the optical element relative to the frame body;
   wherein a width of the plate coil along a horizontal direction is greater than a width of the magnet along the horizontal direction, wherein the horizontal direction is perpendicular to the optical axis.

2. The optical driving mechanism as claimed in claim 1, wherein the plate coil is parallel to the optical axis.

3. The optical driving mechanism as claimed in claim 1, wherein the optical driving mechanism further comprises a conductive element, disposed on the holding member, and the conductive element includes two electrical connecting portions, wherein the electrical connecting portions are connected to the plate coil and are disposed on a same side of the holding member.

4. The optical driving mechanism as claimed in claim 1, wherein the holding member further comprises a stop portion which makes contact with the plate coil and constrains the plate coil in a preset position of the holding member.

5. The optical driving mechanism as claimed in claim 4, wherein the plate coil comprises two protruding portions, and the stop portion is located between the protruding portions.

6. The optical driving mechanism as claimed in claim 5, wherein the optical driving mechanism further comprises a conductive element, disposed on the holding member and electrically connected to the protruding portions.

7. The optical driving mechanism as claimed in claim 6, wherein the conductive element is a resilient element for connecting the frame body and the holding member.

8. The optical driving mechanism as claimed in claim 6, wherein the conductive element comprises a first welding surface, the plate coil comprises a second welding surface, the second welding surface is perpendicular to the first welding surface, and the conductive element and the plate coil are welded to each other via the first welding surface and the second welding surface.

9. The optical driving mechanism as claimed in claim 1, wherein the optical driving mechanism further comprises a casing and a plurality of a damping elements, and the holding member comprises at least one constraining portion, wherein the damping elements are configured to connect the constraining portion to the casing or connect the constraining portion to the frame body.

10. The optical driving mechanism as claimed in claim 1, wherein the holding member comprises a groove, configured to accommodate the plate coil.

11. The optical driving mechanism as claimed in claim 10, wherein the holding member further comprises two constraining portions which protrude on one side of the holding member, and the groove is formed between the constraining portions.

12. The optical driving mechanism as claimed in claim 11, wherein the optical driving mechanism further comprises a casing, and the constraining portions are in contact with the casing, so as to constrain the holding member in a first-limit position.

13. The optical driving mechanism as claimed in claim 11, wherein the constraining portions are in contact with the frame body, so as to constrain the holding member in a second-limit position.

14. The optical driving mechanism as claimed in claim 1, wherein the holding member comprises two stop portions, disposed on the corners of two opposite sides of the holding member.

15. The optical driving mechanism as claimed in claim 1, wherein the optical driving mechanism further comprises a circuit element which is formed on the holding member using molded interconnect device (MID) technology.

16. The optical driving mechanism as claimed in claim 15, wherein a separating distance along a side direction is formed between the circuit element and the plate coil, and the side direction is perpendicular to the optical axis.

17. An optical driving mechanism comprising:
a frame body;
a holding member, movably disposed in the frame body and configured to hold an optical element;
a plate coil, disposed on the holding member; and
a magnet, disposed on the frame body, wherein the magnet corresponds to the plate coil;
wherein the plate coil acts with the magnet to generate an electromagnetic force to drive the holding member and the optical element to move along an optical axis of the optical element relative to the frame body;
wherein the holding member has a minimum thickness along a side direction, the plate coil has a thickness along the side direction, and the thickness of the plate coil is greater than the minimum thickness, wherein the side direction is perpendicular to the optical axis.

18. An optical driving mechanism, comprising:
a frame body;
a holding member, movably disposed in the frame body and configured to hold an optical element;
a plate coil, disposed on the holding member; and
a magnet, disposed on the frame body, wherein the magnet corresponds to the plate coil;
wherein the plate coil acts with the magnet to generate an electromagnetic force to drive the holding member and the optical element to move along an optical axis of the optical element relative to the frame body;
wherein the plate coil is an H-coil, and
wherein there is a plurality of layers in the plate coil, each layer has a height and a width, and the ratio of height to width is greater than 1.5.

* * * * *